United States Patent [19]
Noren et al.

[11] Patent Number: 4,963,758
[45] Date of Patent: Oct. 16, 1990

[54] METHOD OF MAKING COMPACTS CONTAINING PRECISE AMOUNTS OF NUCLEAR FUEL

[75] Inventors: Robert C. Noren, San Diego; Richard P. Vanek, Solana Beach, both of Calif.

[73] Assignee: General Atomics, San Diego, Calif.

[21] Appl. No.: 258,520

[22] Filed: Oct. 17, 1988

[51] Int. Cl.$^5$ .............................................. G21C 21/00
[52] U.S. Cl. ..................... 264/0.5; 376/411; 376/414; 427/6
[58] Field of Search ................. 376/411, 414; 264/0.5; 427/6

[56] References Cited

U.S. PATENT DOCUMENTS 3,992,258 11/1976 Tobin ..................................... 176/67
4,119,563 10/1978 Kadner et al. .................... 252/301.1
4,668,444 5/1987 Becker ................................. 264/0.5

Primary Examiner—Stephen J. Lechert, Jr.
Assistant Examiner—Nina Bhat
Attorney, Agent, or Firm—Fitch, Even, Tabin & Flannery

[57] ABSTRACT

Methods for making nuclear fuel compacts containing precise amounts of nuclear fuel material which exhibit low heavy metal contamination and fewer defective coatings following compact fabrication using a hardenable binder including petroleum pitch or the like. Nuclear fuel particles having a multiple layer fission-product-retentive barrier, with a dense outer layer thereof being surrounded by a protective overcoating, e.g., pyrocarbon having a density between about 1 and 1.2 g/cm$^3$, that is encapsulated within a thin shell of pyrocarbon from about 1.7 to about 2 g/cm$^3$ in density, can be precisely metered to create charges containing very precise amounts of nuclear fuel material that can be pre-compacted in molds under relatively high pressures and then combined with the fluid binder which is ultimately carbonized to produce carbonaceous compacts containing very precise nuclear fuel loadings.

6 Claims, No Drawings

METHOD OF MAKING COMPACTS CONTAINING PRECISE AMOUNTS OF NUCLEAR FUEL

The invention relates generally to nuclear fuel particles less than a few millimeters in size and to methods of making nuclear fuel compacts from such particles for use in nuclear reactors. More particularly, the invention relates to improved nuclear fuel particles having fission-product-retentive coatings which are able to withstand high pressures to which they may be subjected during the formation of dense, nuclear fuel compacts and to methods for producing compacts containing precise amounts of nuclear fuel.

BACKGROUND OF THE INVENTION

Pyrolytic carbon coatings have been used to protect particles of nuclear reactor fuel, i.e., fissile and/or fertile materials, such as uranium, plutonium and thorium in the form of suitable compounds thereof. Coatings of aluminum oxide and other ceramic oxides have also been proposed. Examples of nuclear fuel particles employing pyrolytic carbon coatings include U.S. Pat. No. 3,325,363, issued June 13, 1967; No. 3,298,921, issued Jan. 17, 1968, and No. 3,361,638, issued Jan. 2, 1968. It is also known to incorporate one or more layers of refractory carbide materials, such as silicon carbide or zirconium carbide, to produce nuclear fuel particles having still better fission product retention characteristics, as disclosed in U.S. Pat. No. 3,649,472, issued Mar. 14, 1972. So long as these fission product retentive coatings remain intact, contamination exterior of the particles by the heavy metal fuel material and/or substantial spread of fission products exterior of the coatings is prevented.

Such nuclear fuel particles are usually bonded together in some fashion to create what is termed in the art as a nuclear fuel compact, which is produced using a suitable binder and appropriate pressures. It has been found that fracture and/or cracking of the fission product retentive coatings often occurs during the formation of nuclear fuel compacts wherein these nuclear fuel particles are combined under high pressure with a binder material to produce a relatively dense, "green" compact that is later subjected to high temperatures to produce the final nuclear fuel compact suitable for use in a nuclear reactor which contains a precise amount of nuclear fuel material. Nuclear fuel particles which are better suited for such manufacturing processes are constantly being sought after.

BRIEF SUMMARY OF THE INVENTION

The invention encapsulates, in thin shells, nuclear fuel particles having fission-product-retentive coatings that are protected by appropriate overcoatings and thus provides methods for making nuclear fuel compacts having precise fuel loadings. The employment of overcoating material having a density not greater than about 60% of its theoretical maximum density adequately protects the more fragile fission-product-retentive layers during the green compacting steps, and the thin encapsulating shells allow such particles to be precisely metered to create charges from which fuel compacts are formed.

DETAILED DESCRIPTION OF THE PREFERRED EMBODIMENTS

Very generally, nuclear fuel particles are provided which have central cores of fissile or fertile material surrounded by one or more layers of materials designed to retain within the confines thereof substantially all of the fission products created during burnup of the fissile atoms to a reasonable level. Various layers of materials, such as pyrolytic carbon and silicon carbide, as are known in the art, or other comparable fission-product-retentive materials, can be employed which provide good structural and dimensional stability and fission-product retention even when exposed to high temperatures in high level irradiation for long periods such as will be encountered in the core of a nuclear power reactor. Other suitable fission-product-retentive materials can also be used as a part of the overall fission-product-retentive coating arrangement that surrounds the fissile or fertile cores while still obtaining the benefit the overcoating provides to avoid fracture and/or cracking.

Although the central cores of nuclear fuel material may have different shapes, they are normally generally spherical in shape, and generally the diameter of the sphere will be not greater than about 1 millimeter (1,000 microns). Usually, nuclear fuel will be in the form of spheres between about 100 microns and about 500 microns in diameter. Preferably, fissile fuel cores have a diameter not greater than about 550 microns, and preferably fertile fuel cores are not greater than about 650 microns in diameter. Such so-called fertile fuel cores may contain mixtures of both fissile and fertile materials, for example, mixtures of uranium and thorium compounds. Core materials in the form of oxides or carbides or mixtures thereof are generally used, although other suitable forms, such as the nitride or the silicide, which are stable at relatively high temperatures, could alternatively be employed. Preferably, the fissile fuel cores are formed of mixtures of uranium oxide and uranium carbide; however, uranium oxides, uranium carbides or thorium/uranium carbides could also be employed. On the other hand, fertile fuel cores should contain a suitable, high-temperature, stable thorium material, such as thorium oxide or thorium carbide; and a mixture of thorium carbide and thorium oxide or a mixture of thorium oxide and uranium oxide might be employed.

Because nuclear fuel materials generally expand during high-temperature operation and create gaseous and metallic fission products during fissioning, it is well known to make provision to accommodate these effects in order to facilitate prolonged operation under exposure to nuclear flux. Because the density of the core material is usually dictated by other manufacturing process considerations and/or design criteria, cores are normally of relatively dense material and thus unable to accommodate the accumulation of such gaseous fission products within the core region itself. As a result, an initial layer of relatively low density material is provided near the surface of the core to accommodate expansion at a location interior of the outer coatings which constitute the pressure-tight shell and to also accommodate gaseous fission products. The layer which surrounds the core should also be chemically compatible with the core material, both in the environment in which it is deposited and within the nuclear reactor where levels of high neutron flux will be accommodated. Spongy, pyrolytic carbon, which is a soot-like amorphous carbon having a diffuse X-ray diffraction pattern, is well known in the art and commonly employed for this purpose. Such spongy pyrocarbon also attenuates fission recoils and prevents structural damage to the outer layers, and as such it is generally employed somewhere between 20 microns and about 100 microns in thickness.

The intermediate layers which create the pressure-tight shell are often a combination of layers of relatively dense isotropic pyrolytic carbon and one or more layers of silicon carbide or zirconium carbide of sufficient thickness to provide good retention of metallic fission products. In general, dense, isotropic, pyrolytic carbon has good dimensional stability and, as such, is often provided both immediately interior of and exterior of such a silicon carbide layer. The interior pyrocarbon layer may be about 20–50 microns thick.

Generally, a continuous layer of silicon or zirconium carbide between about 20 microns to 45 microns in thickness is employed to assure adequate containment of metallic fission products is achieved. Such silicon or zirconium carbide layers can be applied in any suitable manner to achieve satisfactory densities which are usually at least about 90% of the theoretical maximum density of the carbide material. Such a layer can be advantageously deposited from a vaporous atmosphere in a fluidized bed coating apparatus or the like as, for example, that described in detail in U.S. Pat. No. 3,298,921. For example, silicon carbide can be directly deposited from a mixture of hydrogen and methyltrichlorosilane, which easily produces densities of about 99% of maximum theoretical density.

Dense isotropic carbon has both good impermeability to gas and good dimensional stability during neutron irradiation, and generally its isotrophy should measure not more than about 1.2 on the Bacon scale. Such dense isotropic pyrolytic carbon can be deposited at relatively low temperatures, e.g., 1250 to 1400° C. or at temperatures at between about 1800 to 2200° C. At higher temperatures, a gas mixture containing about 10% by volume methane can be used, whereas at lower temperatures mixtures of about 20–40% propane or butane can be used. In general, about 25–50 microns of dense isotropic pyrolytic carbon is employed exterior of the metal carbide layer, and it should have a density of at least about 80% of the theoretical maximum density, e.g., about 1.85 to 1.95 g/cm$^3$.

The foregoing describes certain multiple layer fission-product-retentive coating arrangements that can be used to provide a pressure-tight barrier about a nuclear fuel material core; as indicated hereinbefore, other suitable fission-product-retentive arrangements can be employed. It is contemplated that these fission-product-retentive nuclear fuel particles should retain therewithin substantially all of the fission products generated throughout a burnup of up to about 30% of the fissile and/or fertile atoms present in the core. Very generally, the outer dimension of the coated nuclear fuel particle will usually not exceed the range of about to 5 millimeters, even if a nuclear fuel core as large as about 1 millimeter were employed A protective overcoating is disposed exterior of the outermost layer of the fission-product-retentive barrier and has a density of about 60% of its theoretical maximum density or less. As indicated above, normally the exterior surface of the fission-product-retentive arrangement, or a layer very close thereto, will have a density equal to at least about 80% of its theoretical maximum density, and it is this relatively brittle or fragile material to which the overcoating material affords mechanical protection during the ensuing fabrication process. The preferred overcoating material is pyrocarbon having a density not greater than about 1.4 grams per cm$^3$, and preferably the pyrocarbon is isotropic pyrocarbon having a density between about 0.8 and about 1.4 grams per cm$^3$. To afford adequate protection, it is believed that the thickness of the protective pyrocarbon should measure at least about 20 microns. Although there is no upper limit to such a protective layer, the constraint of providing adequate nuclear fuel loading within certain spatial parameters places constraints upon the maximum thickness of the overcoating and of the pressure-tight barrier. A protective overcoating between about 15 and about 70 microns in thickness is employed, preferably between about 15 and about 45 microns of pyrocarbon. For example, such a pyrocarbon overcoating may be used having a thickness of at least about 40 microns and a density between about 1.1 and about 1.3 grams per cm$^3$. Although pyrocarbon is the preferred protective overcoating material, other chemically compatible substances having suitable nuclear properties might alternatively be employed. For example, aluminum oxide might be employed as a protective overcoating, having a density between about 1.5 and about 2.0 grams per cubic centimeter.

The thin, encapsulating, outermost shell is formed of relatively dense material which will exhibit good integrity and will avoid fouling or otherwise interfering with the very precise metering equipment which is necessary to reliably and reproducibly provide a charge containing a precise amount of nuclear fuel desired for a particular nuclear fuel compact. More specifically, the material from which the encapsulating shell is formed should have a density equal to at least about 80% of its theoretical maximum density, and suitable materials are used which are compatible with the coating layer which it surrounds and with the binder that will eventually be employed. Examples include pyrolytic carbon and aluminum oxide, and preferably pyrocarbon having a density between about 1.7 and about 2 grams/cm$^3$, and most preferably at least about 1.9 grams/cm$^3$, is employed. The thickness of the encapsulating shell should be greater than about 2 microns, and preferably a thickness between about 3 and about 5 microns is employed. Whereas thicker shells might be used, they are not considered necessary, and the previously discussed spatial constraints are again pertinent in this respect. The pyrocarbon can be deposited from a gaseous atmosphere containing a combination of an inert gas, such as helium or argon, and a suitable carbonaceous material, such as methane or some other alkane or alkene having not more than about 5 carbon atoms, and the same fluidized bed coater in which the protective overcoating layer is deposited can be used, if desired. For example, a suitable thin pyrocarbon shell can be deposited from an atmosphere containing about 97 volume percent argon and 3 volume percent propylene at a temperature of about 1150° C.

Such particles are well suited for use with automated equipment which can measure, either by weight or by volume, a precise charge of these generally spherical particles containing the desired amount of nuclear fuel material within very close tolerances. An example of suitable equipment for this use is illustrated in U.S. Pat. No. 4,111,335, the disclosure of which is incorporated herein by reference. Such sophisticated equipment is relatively delicate in its operation and is unable to tolerate the character of the protective overcoating. Small amounts of pyrocarbon dust from fragile low density pyrocarbon protective overcoatings frequently accumulated in the precise measuring equipment causing the measuring equipment to malfunction and thus fail to create the precise charges of fuel that were needed. However, as a result of the inclusion of the encapsulating exterior shell, it is found that such metering equipment is able to operate in a fully automated fashion for long periods of time, producing charges containing very precise amounts of nuclear fuel material.

The exterior diameter of the coated nuclear fuel particle which includes the protective overcoating and its encapsulating shell will vary depending upon the size of the core and the thickness of the pressure-tight barrier. Preferably, however, the outer diameter of fertile nuclear fuel particles does not exceed about 1300 microns, and the outer diameter of particles having fissile fuel cores does not exceed about 1200 microns.

To form fuel compacts usable in a nuclear reactor, the coated fuel particles having these protective overcoatings are combined in very precise amounts with a flowable hardenable binder under pressure in a mold of the desired size and shape. All fissile fuel particles may be used or a combination of fissile and fertile particles can be used. In either instance, some shim particles may also be used. The very precise amount of fuel which is to be contained in each charge of fuel is determined on a production-line basis by sophisticated metering equipment, and as a result, following the hardening of the binder, a nuclear fuel compact having the desired, very precise fuel loading is achieved. The metering of the precise fuel loading is achieved. The metering of the nuclear fuel particles to produce charges containing very precise amounts of nuclear fuel in an automated fashion is accomplished by measuring the weight and/or the volume of the particles. For example, an initial measurement can be made by volume and a final weight measurement made, or vice versa. Alternatively, all of the measurements might be made by weight or by volume.

In any respect, apparatus for making such measurements on an automated production line basis is sensitive to the environment created by the material being metered. As indicated above, oftentimes a mixture of fertile and/or fissile particles will be employed in a particular nuclear fuel compact, and an amount of nonfuel-containing material, termed "shim" material, may be employed in certain fuel compacts in order to provide a compact of slightly different fuel density, because a nuclear fuel core will normally contain compacts of different fuel loadings at different locations within the core of the reactor. As a result, when such mixtures are employed, it is necessary to meter more than one material and then blend the different materials which go into such mixed compact, and this is commonly done by employing pulses of nitrogen air to effect such mixing. In order to accomplish such measurements and feedings, vibratory feeders are frequently used, and various transfer tubes are commonly employed within which the particles physically move. The overall automation is controlled by a suitable electronic control system and utilizes a variety of valves, including slide valves and pinch valves. It was found that the sensitive electronic measuring mechanisms and the transfer equipment was simply unable to tolerate particles having the desired outer, relatively low density coating, with the result that precision in composition of charges of nuclear fuel could not be maintained over long periods of time. However, it was found that the benefits of the protective overcoatings could be retained and such interference with the precision of metering by this automated equipment could be avoided as a result of the presence of the exterior encapsulating shell. The particles containing such shells have been found to be capable of being measured volumetrically and/or by weight on a reproducible, long term basis.

Suitable methods for forming nuclear fuel compacts from charges of coated particles are disclosed in U.S. Pat. No. 4,024,209, the disclosure of which is incorporated herein by reference. After the coated particles have been supplied to a mold cavity and before the binder is supplied, the overcoated nuclear fuel particles are often subjected to pre-compacting pressures; for example, pressures between about 100 psig and about 600 psig may be employed. Thereafter, to achieve the desired fuel density within such a compact, the particles and binder are subjected to relatively high pressure, and a pressure of at least about 600 psig is commonly employed.

Various binders can be used, including binders that are flowable as a result of their being in a molten condition and which are hardened by cooling. The binders may be thermoplastic materials or thermosetting polymers. Often, a binder of a thermoplastic material such as pitch, particularly petroleum pitch or coal tar pitch, and particularly in mixture with graphite powder or flour and other known additives, is used. Suitable compositions of this type, including pitch and certain alcohol and fatty acid additives, are disclosed in U.S. Pat. No. 4,217,174, issued Aug. 12, 1980, the disclosure of which is incorporated herein by reference. Alternatively, other types of resins, such as phenolic resins or furfural resins which can be carbonized may also be used. The preferred binders include mixtures of petroleum pitch and graphite flour, relatively fine particle size graphite of less than about 40 microns, and are hardened by heating to a temperature of at least about 1000° C. Generally, so as not to unduly delay fabrication time and so as to assure that complete carbonization is achieved, temperatures of as high as about 2100° C. may be employed.

Following cooling to room temperature, groups of several thousand compacts are often examined using tests to determine the extent of heavy metal (fissile or fertile) material which is leached from samples from the compact groups and thereby ascertain whether particles suffered such fracture damage as to indicate a substantial loss of the fission-product-retention capability sufficient to cause rejection of the compact group. These tests show the effectiveness of the protective overcoatings in maintaining the integrity of the pressure-tight barriers during the compacting of the green material. Moreover, testing of these compacts following substantial neutron irradiation to a significant burnup of the nuclear fuel also shows equally significant improvement in fission-product retention over compacts made from particles without such protective overcoatings and confirms the test results that are obtained by burning one of the compacts in order to ascertain the continued integrity of SiC layers.

The following example illustrates a preferred method for making nuclear fuel particles, and nuclear fuel compacts utilizing such particles, of the types generally herein described. However, this example should be understood to in no way limit the scope of the invention which is defined by the appended claims.

EXAMPLE

Minute spheres of a mixture of uranium oxide and uranium carbide are prepared having a major portion of uranium oxide material. Stoichiometrically, the spheres can be viewed as having the composition $UC_{0.3}O_{1.7}$. The particle size of the spheres is about 350 microns, and the spheres are considered as being substantially fully dense.

The spheres are heated in a suitable coating apparatus in a fluidized bed to a temperature about 1100° C. using a levitating flow of argon. A buffer coating of spongy pyrocarbon is deposited at about atmospheric pressure from acetylene gas and argon, each at about 50 volume percent (v/o). The acetylene decomposes and deposits low density, spongy carbon upon the cores, and flow is continued for sufficient time to deposit a layer about 40 to 50 microns thick having a density about 1.1 gram per cc.

The flow of acetylene is then terminated, and the temperature is raised to about 1200° C. Propylene at about 3 volume percent is injected into the stream, and coating is carried out for about 20 minutes. This produces a thin, anisotropic coating of generally laminar carbon having a density of about 1.9 grams per $cm^3$.

The buffer-coated cores are then heated to about 1400° C., and a mixture of about 12 v/o propylene, about 12 v/o acetylene, about 22 v/o argon, and the remainder hydrogen is employed to deposit a layer of isotropic pyrocarbon about 50 microns thick having a density of about 1.95 $g/cm^3$ and a BAF of about 1.1.

The temperature is then raised to about 1600° C. and hydrogen alone is used as the fluidizing gas with about 10% by volume of the hydrogen stream being bubbled through a bath of methyltrichlorosilane. After about 2 hours at these conditions, silicon carbide has been uniformly deposited upon the carbon-coated spheres in the form of a layer of about 20 microns thick. Subsequent measurement and examination shows that the silicon carbide is beta-phase SiC having a density of about 3.18 $g/cm^3$, which is about 99% of theoretical density of silicon carbide.

The silicon carbide-coated cores are maintained in this fluidized condition substituting argon or nitrogen as the fluidizing gas, and the temperature is lowered to about 1400° C. At this temperature, a mixture of 13 v/o propylene, about 17 v/o acetylene, about 21 v/o argon, and the remainder hydrogen is injected to again deposit isotropic pyrocarbon having a density of about 1.95 $g/cm^3$ and a BAF of about 1.1.

The temperature of the fluidized particles is then lowered to about 1200° C., and acetylene and argon at about 50 v/o each are injected for about 10 minutes. Examination of some of these particles after removal shows an exterior coating of pyrocarbon having a density of about 1.1 $g/cm^3$ and a thickness of between about 30 and 45 microns, with the mean thickness being about 40 microns for the overcoated material.

The temperature of the fluidized bed of particles is next raised to about 1150° C. Propylene at about 3 v/o and the remainder argon is injected for about 20 minutes, at about atmospheric pressure, and a dense anisotropic pyrocarbon is deposited having a BAF of at least about 1.7. At the end of this period of time, the particles are cooled to near room temperature in a fluidizing gas stream and then removed and examined. The exterior coating of pyrocarbon shows a density of about 1.9 $g/cm^3$ and a thickness of between about 2 and 5 microns.

These overcoated particles are employed to fabricate fuel compacts of generally cylindrical shape having a diameter of about 0.5 inch and a height of about 2 inches. As an example, charges of approximately 5 grams of these particles plus about 5 grams of fertile fuel particles having generally similar coating arrangements and outer diameters of about 650 microns are metered into molds which are being vibrated to assure adequate filling following blending in a multichamber transfer tray. A metering system generally similar to that shown in U.S. Pat. No. 4,111,335 to Arya, et al. is used to meter two separate charges containing precise amounts of fissile and fertile nuclear fuel so that the completed compacts will have a heavy metal core total volume of about 2.24 $cm^3$ in a compact of about 6 $cm^3$.

The metering system initially fills a separate, adjustable volumetric chamber with a predetermined amount of particles for each of the fissile and fertile materials. After filling is complete, valves at the bottom of the volumetric chambers are opened, and the charges are caused to flow into intermediate cups which are monitored by sensitive electronic weighing mechanisms to calculate any deficits from the final desired amounts. The deficits are then made up by the supply of additional particles using vibratory feeders which are operated for precise lengths of time at predetermined feed rates calculated to supply the deficits. Based upon any deficit, adjustments can be made to the volumetric setting to more closely approach the desired charge for the next accumulation. A final check of the weights is effected, and when both are within tolerances, valves are opened to discharge the contents of the cups into a common funnel wherein initial mixing occurs, which funnel directs the particle charges to a cavity within a transfer tray wherein more extensive blending occurs as a result of the application of upwardly directed pulses of nitrogen. After all 40 cavities in the transfer tray are filled, it is used to deliver the metered and blended charges of nuclear fuel to the individual molds for the fuel compacts.

Pre-compaction pressure at about 175 psig is employed to initially reduce the size of the mold to essentially that of the desired height of the fuel compact. After pre-compaction is complete, there is injected a mixture containing 100 parts by weight petroleum pitch and 124 parts graphite flour. Delivery of the particle charge into the individual mold cavities is via passageway arrangements that extend around the pistons at one end of the cavities. Injection takes place at a pressure of about 150 psig, and the temperature of the pitch mixture and the mold are maintained at about 165° C. Once injection is complete, the temperature of the mold is cooled to solidify the binder, and the compacts are ejected from the mold at a temperature of about 25° C. They are then transferred to a furnace where they are heated for about 1 hour at a temperature of about 900° C. in order to carbonize the binder material. Next they are heat-treated in another furnace at about 1750° C. to finish the binder carbonization process.

The individual coated nuclear fuel particles made in Example I are tested along with particles removed from the coater prior to the application of the final protective overcoating. The earlier-removed particles exhibit a crush strength of about 6 pounds, whereas the particles, after application of the protective overcoatings and the encapsulating shells, show a crush strength, with respect to the fission-product-retentive barriers, nearly double that value. Samples of the heat-treated fuel compacts are loaded into graphite crucibles in a furnace that is then heated to a temperature of about 1650° C. wherein hydrogen chloride gas is circulated for about 1 hour. Gaseous chlorides of uranium and thorium are formed, and by monitoring the amounts of such chlorides, the heavy metal contamination can be calculated. The compacts show less than $1 \times 10^{-5}$ grams of heavy metal per total grams of heavy metal in the compact, thus showing that the desired level of quality is obtained. Compacts made using such coated nuclear fuel particles without the protective overcoatings are similarly examined for heavy metal contamination and are found to exhibit contamination of just slightly less than $3 \times 10^{-5}$ grams of heavy metal, thus putting into perspective the reduction which is achieved by the use of the protective overcoatings.

Following a final inspection for correct dimensions and visual appearance, the fuel compacts are ready for loading into nuclear fuel blocks to form fuel elements. Testing by burning one such compact shows that the protection afforded by the overcoating during the fabrication process results in a significant decrease in the fraction of defective fission-product-retentive coatings to a level of about 60% of those found in compacts without the protective overcoatings and encapsulating shells. Moreover, analysis of representative compact for heavy metal loading shows that extremely precise levels of fuel loading are achieved, well within desired tolerances.

Although the invention has been described with regard to the best mode presently understood by the inventors, changes and modifications as would be obvious to one having the ordinary skill in this art may be made without departing from the scope of the invention which is to be found in the claims appended hereto. Particular features of the invention are emphasized in the claims that follow.

What is claimed is:

1. A method of making nuclear fuel compacts containing precise amounts of nuclear fuel, which method comprises coating generally spherical cores of fissile or fertile nuclear fuel material with a surrounding fission-product retention barrier including a plurality of different layers, depositing a relatively low density protective overcoating exterior of said fission-product-retention barrier, depositing a thin layer of relatively dense material upon the surface of said protective overcoating from a vapor atmosphere under conditions so that the resultant nuclear fuel particles have an outermost encapsulating shell having a thickness of at least about 2 microns, metering said nuclear fuel particles to form charges containing a precise amount of nuclear fuel desired for a particular compact, by measuring the volume and/or weight of accumulated nuclear fuel particles, loading said charges into confined spaces, and filling the remainder of the confined space not occupied by said nuclear fuel particles with a fluid, hardenable binder by injection into the interstices thereof and then hardening the binder to form solid nuclear fuel compacts containing a precise amount of nuclear fuel, whereby said thin, dense, encapsulating shells prevent the abrasion of said relatively low density protective overcoating material and thereby assure continuous metering of precise amounts of nuclear fuel in each charge over extended periods of operation.

2. A method according to claim 1 wherein said metering is accomplished by measuring the weight of each said charge.

3. A method according to claim 1 wherein said metering is accomplished by initially measuring the volume of accumulated particles and then measuring the weight of each said charge.

4. A method according to claim 1 wherein said overcoating is deposited by the pyrolytic decomposition of a hydrocarbon to deposit pyrocarbon having a density of less than about 1.3 grams/cm$^3$, 5. A method according to claim 1 wherein said thin layer of relatively dense material is deposited by pyrolysis of a hydrocarbon under conditions so that said outermost shell is anisotropic, having a BAF of about 1.7 or higher and a density of at least about 1.7 grams/cm$^3$.

6. A method according to claim 1 wherein said binder is a mixture of pitch and graphite flour.

* * * * *

UNITED STATES PATENT AND TRADEMARK OFFICE
CERTIFICATE OF CORRECTION

PATENT NO. : 4,963,758
DATED : 10/16/90
INVENTOR(S) : Noren, et al.

It is certified that error appears in the above-identified patent and that said Letters Patent is hereby corrected as shown below:

Column 2, line 27, change "I" to --1--.

Column 3, line 59, after "about" insert --3--.

Column 3, line 61, after "employed" insert --.--.

Signed and Sealed this

Seventeenth Day of March, 1992

Attest:

HARRY F. MANBECK, JR.

*Attesting Officer*  *Commissioner of Patents and Trademarks*